United States Patent [19]

Smet

[11] Patent Number: 5,403,043
[45] Date of Patent: Apr. 4, 1995

[54] QUICK CONNECT PIPE COUPLING

[76] Inventor: Marc J. Smet, Kasteel Street 39, Mol, Belgium

[21] Appl. No.: 169,760

[22] Filed: Dec. 20, 1993

Related U.S. Application Data

[63] Continuation of Ser. No. 808,806, Dec. 18, 1991, abandoned.

[51] Int. Cl.⁶ ............................................. F16L 35/00
[52] U.S. Cl. ...................................... 285/39; 285/92; 285/175; 285/391
[58] Field of Search ...................... 285/391, 92, 81, 39, 285/175

[56]  References Cited

U.S. PATENT DOCUMENTS

| | | | |
|---|---|---|---|
| 112,958 | 3/1871 | Ramp . | |
| 222,713 | 12/1879 | Lawson . | |
| 290,663 | 12/1883 | Blue . | |
| 1,325,468 | 12/1919 | Foster . | |
| 1,349,518 | 8/1920 | Lyle | 285/39 X |
| 1,494,524 | 5/1924 | Adamson | 285/391 X |
| 1,539,287 | 5/1925 | Wilson | 285/391 X |
| 1,580,963 | 4/1926 | Crandall | 285/39 X |
| 1,629,058 | 5/1927 | Wilson . | |
| 2,475,322 | 7/1949 | Horton et al. | 265/391 X |
| 2,673,751 | 3/1954 | Finch | 285/391 X |
| 2,695,797 | 11/1954 | McCarthy . | |
| 3,540,762 | 11/1970 | Dunlap . | |
| 3,600,008 | 8/1971 | Barry | 285/391 X |
| 4,124,229 | 11/1978 | Ahlstone | 285/391 X |
| 4,260,180 | 4/1981 | Halushka et al. . | |
| 4,406,485 | 9/1983 | Giebeler | 285/391 |
| 4,426,105 | 1/1984 | Plaquin et al. | 265/92 |
| 4,940,260 | 7/1990 | Odriozola | 285/92 X |

FOREIGN PATENT DOCUMENTS

| | | | |
|---|---|---|---|
| 609086 | 8/1926 | France | 285/391 |
| 566270 | 12/1944 | United Kingdom | 285/391 |
| 2112892 | 7/1983 | United Kingdom | 285/92 |

*Primary Examiner*—Dave W. Arola
*Attorney, Agent, or Firm*—Stevens, Davis, Miller & Mosher

[57]  ABSTRACT

A pipe coupling having mating pin and socket elements, each having pitched interlocking fins. The two elements are mated by slidingly engaging the two elements and then rotating them. An O-ring may be added to one or the other of the elements to create a more leak-tight seal between the two elements. Additionally, the pin and socket elements may each have saw tooth shaped teeth which interact as a locking means for the pipe coupling.

12 Claims, 4 Drawing Sheets

QUICK CONNECT PIPE COUPLING

This application is a Continuation of application Serial No. 07/808,806, filed Dec. 18, 1991, and now abandoned.

FIELD OF THE INVENTION

The present invention relates to pipe couplings. In particular, this invention relates to quick-connect/disconnect couplings having interlocking fins in lieu of threads.

BACKGROUND OF THE INVENTION

Pipe sections may be joined by a number of means including welding, gluing or the use of threaded couplings. Traditionally, threaded couplings involve two, three or four components. In one such device, two tube lengths, each one having a shoulder at one end may be joined by two mating elements, which slide over the tube length, one mating element having external threads, the other element having internal threads. In all, four elements must be brought together to carry out the mating process. Similarly, in a three element mating process, one tube length may have external threads to be mated to an internally threaded element which slides over a non-externally threaded tube length. Finally, both tube lengths may themselves have threaded sections which mate directly.

These traditional threaded couplings used to join two lengths of tubing suffer from a number of shortcomings. These include, the total number of elements needed to complete the mating process, the likelihood of improper alignment of the elements leading to screw-thread damage, and the inconvenience of multi-turn rotation of at least one of the elements in order to complete the mating process.

In an effort to reduce the number of such shortcomings or to reduce the severity therefrom, there have been developed threaded pipe couplings in which the threaded sections of the mating components are segmented, interposed by an equal number of nonthreaded or plain segments. The primary advantage of such schemes has been to reduce the rotational motion of the mating elements to less than one full turn.

U.S. Pat. Nos. 112,958 and 3,540,762 (the disclosures of which are incorporated herein by reference), are examples of three element couplings with segmented threads. The disadvantage of these designs is in the number of components required which reduces the ease and speed of connecting and disconnecting the assembly.

U.S. Pat. Nos. 222,713 and 1,629,058 (the disclosures of which are incorporated herein by reference), are examples of two element segmented thread couplings. One disadvantage of each of these designs is the small size of such threads. By reducing the amount of thread surface, there is a corresponding reduction in the strength of the coupling.

OBJECTS OF THE INVENTION

It is therefore a primary object of this invention to overcome the deficiencies of the prior art threaded couplings by providing a two element pipe coupling with interlocking fins. This coupling avoids the problems of cross-threading due to misalignment and loss of strength due to reduced thread area.

It is a further object of this invention to provide a coupling which is connected or disconnected quickly by rotation through a partial turn.

It is a further object of this invention to provide a coupling which when connected can only be disconnected by destroying the coupling.

SUMMARY OF THE INVENTION

The present invention is a two element pipe coupling with interlocking fins. The first element, which is the pin element, is circumferential and has a longitudinal axis, a rear section and a forward section integrally connected by a shoulder. The rear section may be of the socket type wherein a plain tubing length may be permanently secured therein or wherein the rear section is the tube length itself and the coupling is formed in the end of the tube. The exterior of the forward section of the pin element contains four circumferentially spaced longitudinal columns of fins interposed by four non-finned segments. Each longitudinal column of fills contains three fins. The fins extend radially outwardly on the forward section. The fins are substantially rectangular, with continuously rounded ends and are pitched relative to the longitudinal axis of the coupling at an angle $\theta$ so as to clause binding against the shoulder of the pin element when the two elements of the coupling are mated.

The second element of the coupling, which is the socket element, is also circumferential, and has a longitudinal axis and a rear section and a forward section integrally connected by a shoulder. Again, the rear section may be either a mating socket for a piece of tubing or may be the tubing itself. The interior of the forward section of the socket element also contains four circumferentially spaced longitudinal columns of fins interposed by four non-finned segments. Each internally finned segment contains two fins. The fins extend radially inwardly from the interior of the forward section. These fins are also substantially rectangular with continuously rounded ends and are pitched at an angle $\theta$ with respect to the longitudinal axis of the socket or the coupling. Of course, $\theta$ corresponds to the angle of pitch of the external fins of the pin element. The fins of both the pin element and the socket element are arranged to be interlocking.

The depth of the fins are constructed to substantially offset the reduction of circumferential surface created when a thread type construction is changed to a fin-type of construction so that there is no loss of load strength. Furthermore, the pitch angle and spacing prevents rotation of the elements in the wrong direction and such construction prevents cross-threading. The continuously rounded ends obviate the necessity of having to fully bottom the two elements prior to rotation.

DETAILED DESCRIPTION OF THE INVENTION

Figure 1:
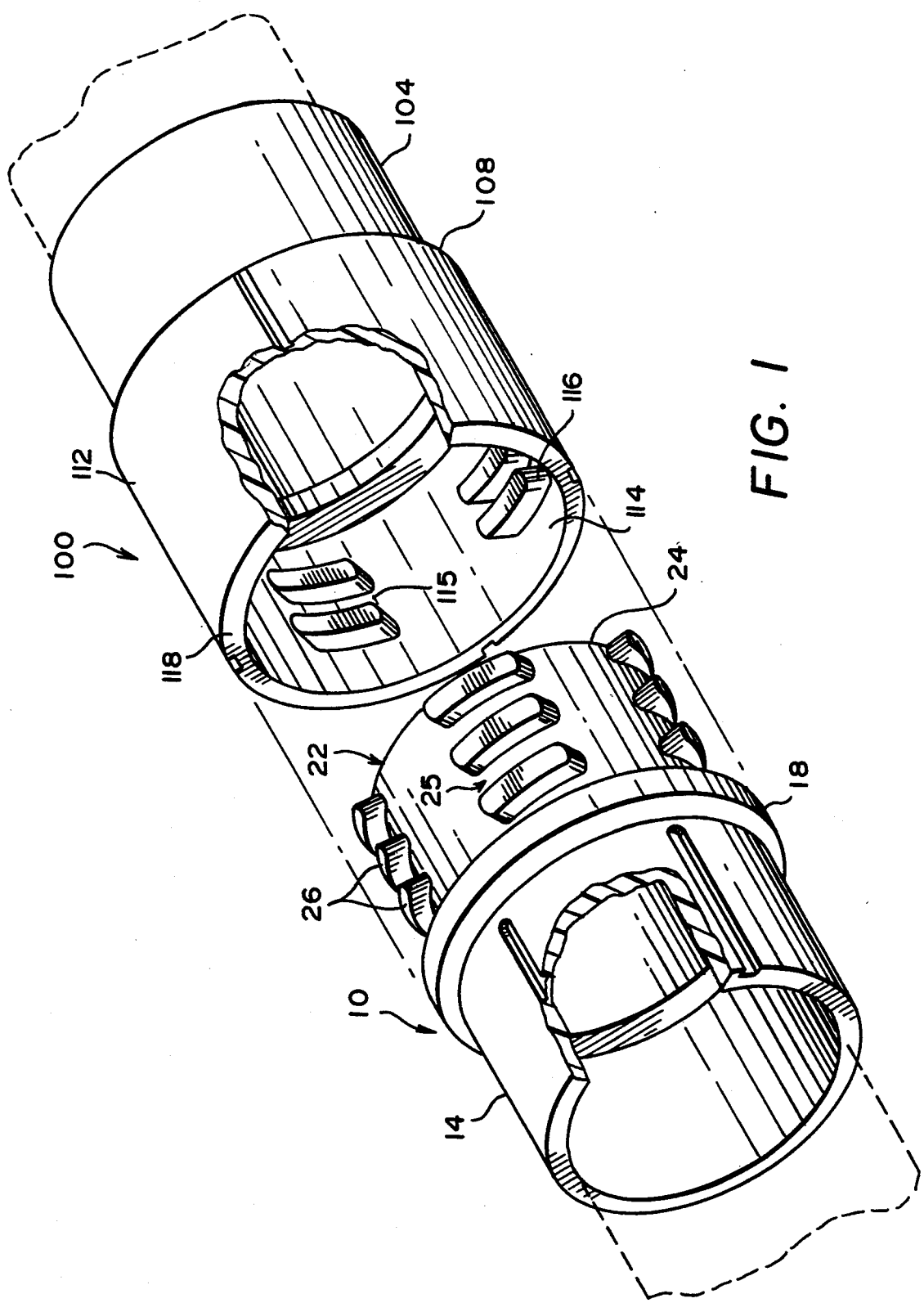
FIG. 1 is a perspective view of the pin and socket members disconnected from each other.

FIG. 1 shows the two mating members of the present invention as well as the major sub elements of the invention. The mating members shown are the pin member 10 and the socket member 100.

Both members 10 and 100 are elongated tubular bodies in their general form each having a longitudinal axis. The mating members 10 and 100 could be formed at the ends of a length of tubing as by machining, or they could be formed by molding or machining as separate elements to be affixed to lengths of tubing or drillrods as by welding or gluing or threading. The members may be manufactured from steel, another metal, PVC or fiberglass.

Figure 2:
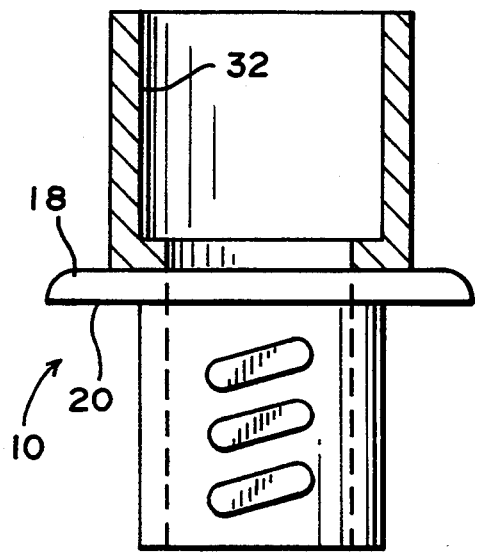
FIG. 2 is an elevational view, partly in section of the pin member showing the interior walls of the rear section as defining a cylindrical opening.
Figure 3:
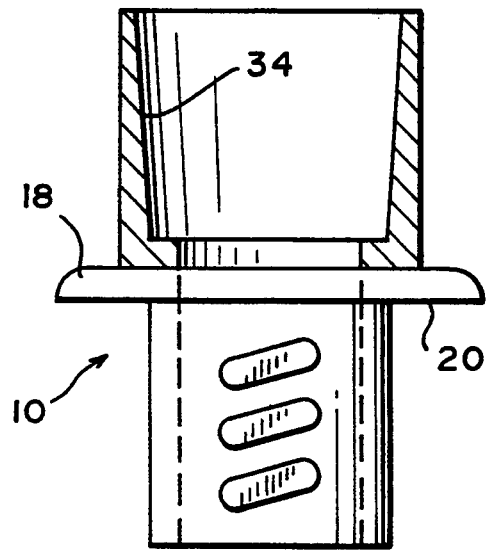
FIG. 3 is a view similar to FIG. 2 but showing the interior walls of the rear section as defining a tapered opening.

The pin member 10 has a hollow cylindrical rear section 14, a radially outwardly circumferentially continuously extending shoulder 18 and a cylindrical front section 22. The rear section 14 may constitute the length of tube as described above or it may be a socket to be affixed to one end of a length of tubing. If the rear section 14 is affixed to one end of a length of tubing then the inside walls of the rear section may be parallel so as to define a cylindrical opening shown in FIG. 2 at 32 or they may be tapered so as to define a frustoconical opening, shown at 34 in FIG. 3.

Figure 6:
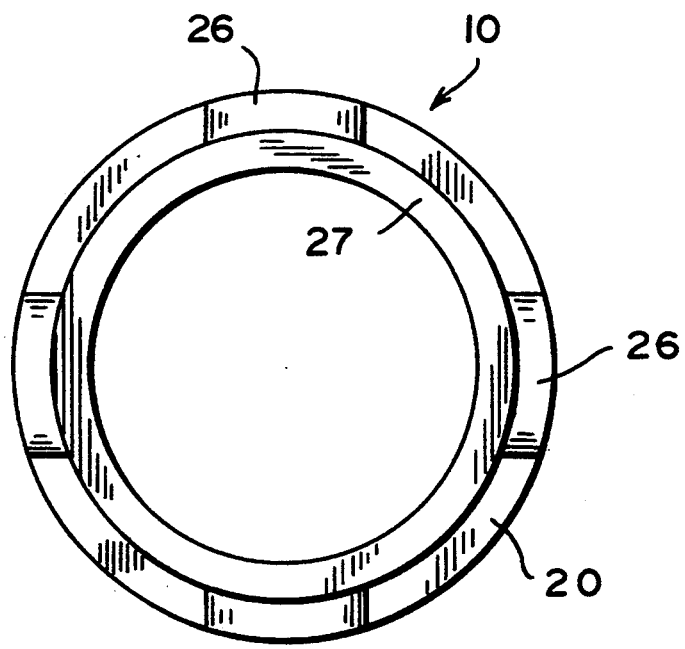
FIG. 6 is an end view of the pin member.
Figure 7:
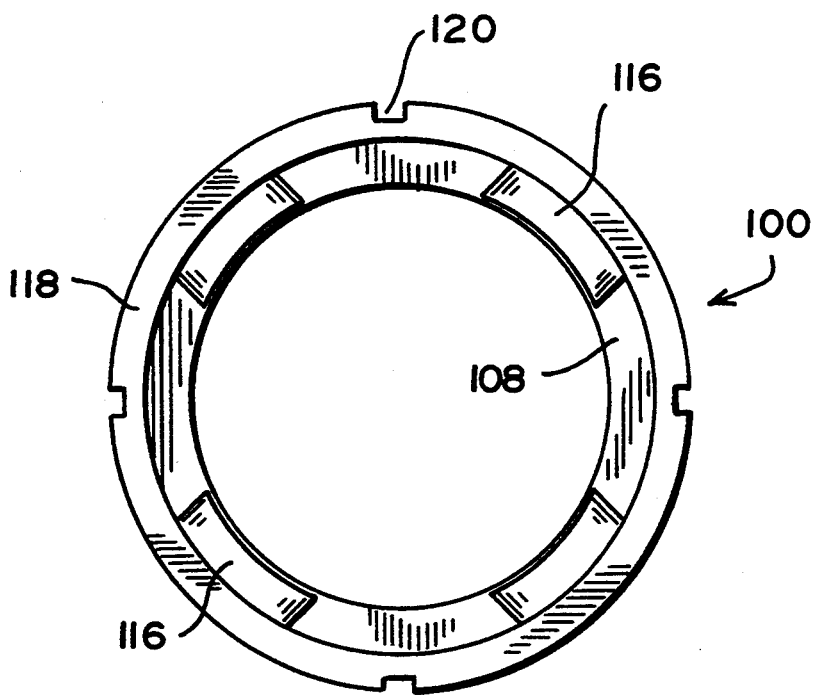
FIG. 7 is an end view of the socket member.

The shoulder 18 integrally connects the rear section 14 of the pin member 10 to the front section 22 of the pin member 10. The diameter of the shoulder 18 may correspond to or be larger than the outer diameter of the rear section 14. As will be described in greater detail below, the shoulder 18 is a functional element of the invention in that the face 20 (see FIG. 6) of the shoulder 18 binds against the rim 118 of the socket member 100 when the pin and socket members are mated. The diameter of the shoulder 18 corresponds in dimension to the outer diameter of the forward section 112 of the socket member 100.

The forward section 22 of the pin member 10 is characterized by an exterior continuously circumferential surface 24 defining a minor diameter with a plurality of radially outwardly extending fins 26 disposed thereon defining a major diameter. The individual fins 26 are grouped together into a plurality of circumferentially spaced columns each having at least one and preferably three fins each. Each fin 26 in an axially extending column is separated from the next fin in the longitudinal column by a circumferentially extending space 25. There are at least two and preferably four longitudinal columns of fins equally spaced around the circumference of the forward section 22. The number of fins in an axially extending column will of course depend on the axial length of surface 24. The number of columns of fins depends of the diameter of the pipes or rods. Each of the longitudinal columns of fins is separated by a non-finned segment of the main surface 24.

Each of the fins 26, in a particular column is identical. They are substantially rectangular but with rounded ends. At least some of the fins 26 on the circumferential surface 24 have an engaging surface and the fins 26 are set at a pitch of preferably between 6° and 15° as defined by the angle formed as a result of the intersection of a line perpendicular to the longitudinal axis of the pin or coupling and the line defined as the longitudinal axis of the fins (see FIG. 8). However, the pitch may be less than 6° or greater than 15°. The columns of fins are also equally spaced around the circumference of the forward section 22 of the pin at 90° apart.

Figure 4:
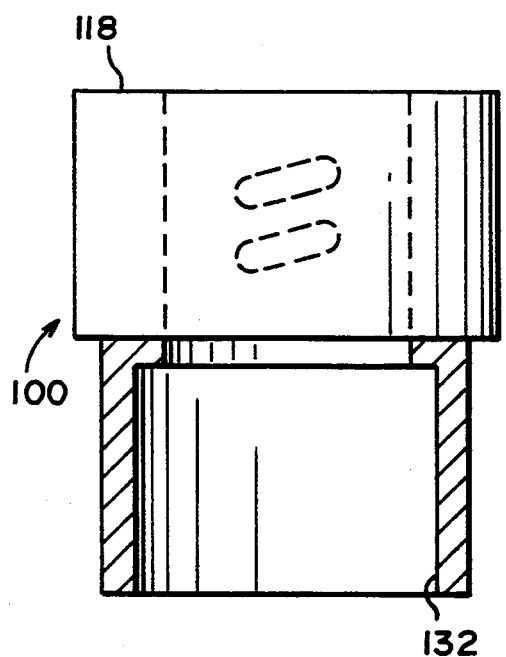
FIG. 4 is an elevational view, partly in section of the socket member showing the interior walls of the rear section as defining a cylindrical opening.
Figure 5:
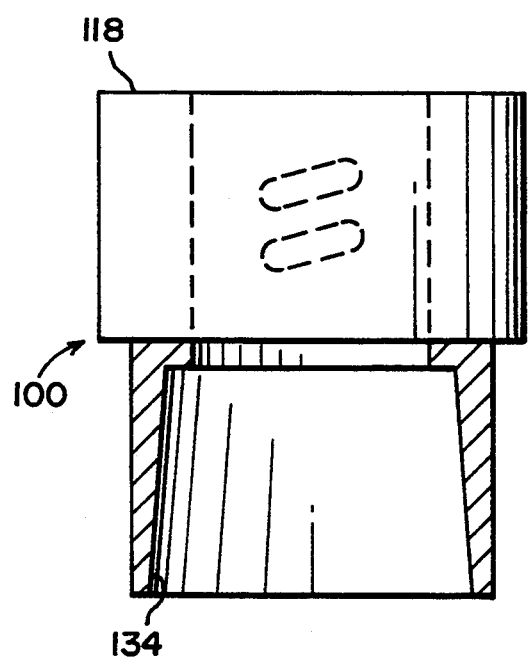
FIG. 5 is a view similar to FIG. 4 but showing interior walls of the rear section defining a tapered opening.

The socket member 100 has a rear section 104 integrally connected to a forward section 112 by a shoulder 108. The forward section 112 of the socket member 100 is configured so as to mate with the forward section 22 of the pin member 10. The rear section 104 may constitute the length of tube as described above or it may be that section of the socket member 100 of the pipe coupling which is affixed to one end of a length of tubing. If the rear section 104 is affixed to one end of a length of tubing, then the inside walls of the rear section 104 forming a socket may be parallel and form a cylindrical socket as shown at 132 in FIG. 4, or they may be at an angle and forming a taper, as shown at 134 in FIG. 5.

The forward section 112 of the socket member 100 is characterized by an interior circumferential surface 114 defining a major diameter with a plurality radially inwardly extending fins 116 disposed thereon defining a minor diameter. The major diameter of pin 10 is slightly smaller in diameter than the major diameter of socket 100 and the minor diameter of the pin 10 is smaller in diameter than the minor diameter of socket 100. By this construction (when the pin is properly rotated with respect to the socket) the socket will receive the pin. The individual fins 116 of the socket 100 are grouped together into axially extending columns of at least one and preferably two fins each. The number of fins 116 in a column on the interior of the socket member is preferably one less than the number of fins 26 in a column on the exterior of the pin member. Each fin 116 in a column is axially separated from the next fin by a space 115. As discussed above fox the pin member 10, there are four longitudinal columns of fins equally spaced around the circumference of the interior of forward section 112. Each of the longitudinal columns is separated by a non-finned segment of the main surface 114.

The radial length of the fins is approximately equal in length to the difference in diameter between the major diameter of the socket and the minor diameter of the pin. The device in FIG. 1 was created., in part, by removing the section of threads from a standard coupling (to create finned and non-finned sections) and adding all the removed threaded section in equal amounts to the created fins. The coupling device shown in FIG. 1 possess the strength of the original coupling. The fins can be created to withstand forces generated during oil well drilling, or pumping fluids under great pressure.

It is also noted that the circumferential length of some of the fins may be longer than other fins, i.e., if the connecting surfaces of the pin and socket are conically shaped the leading fins of the pin would be longer than fins closer to the shoulder of the pin and the leading fins of socket would be shorter than the fins closer to the shoulder.

When connecting the pin member 10 to the socket member 100, one must first rotatably orient the two elements such that the fins of one member are aligned with the non-finned segments of the other member. One must then axially slide the two members toward each other until the rim 118 of the socket member 100 is substantially touching the face 20 of the shoulder 18 of the pin member 10. The two members may then be locked together by rotating the two members by approximately ⅛ of a turn or about 45°.

Upon rotation., the fins 116 slide into the spaces 25 between the fins 26. Because of the pitch of the fins, the socket member is forced towards the pill member. When the rim 118 engages the face 20 of the shoulder 18, the components bind and cannot be further rotated.

To disconnect the two members, simply rotate the pin and socket members oppositely to the rotation applied to connect the pin and socket members.

Other elements may be added to the pin and socket members of the pipe coupling in addition to those described above. These additional elements to be described below may include an O-ring and key or tool slots. A locking device is shown in another embodiment to prevent the pin and socket members from disconnecting. In this embodiment, in order to disengage the elements 10 and 100 the elements must be destroyed.

Figures 8, 9:
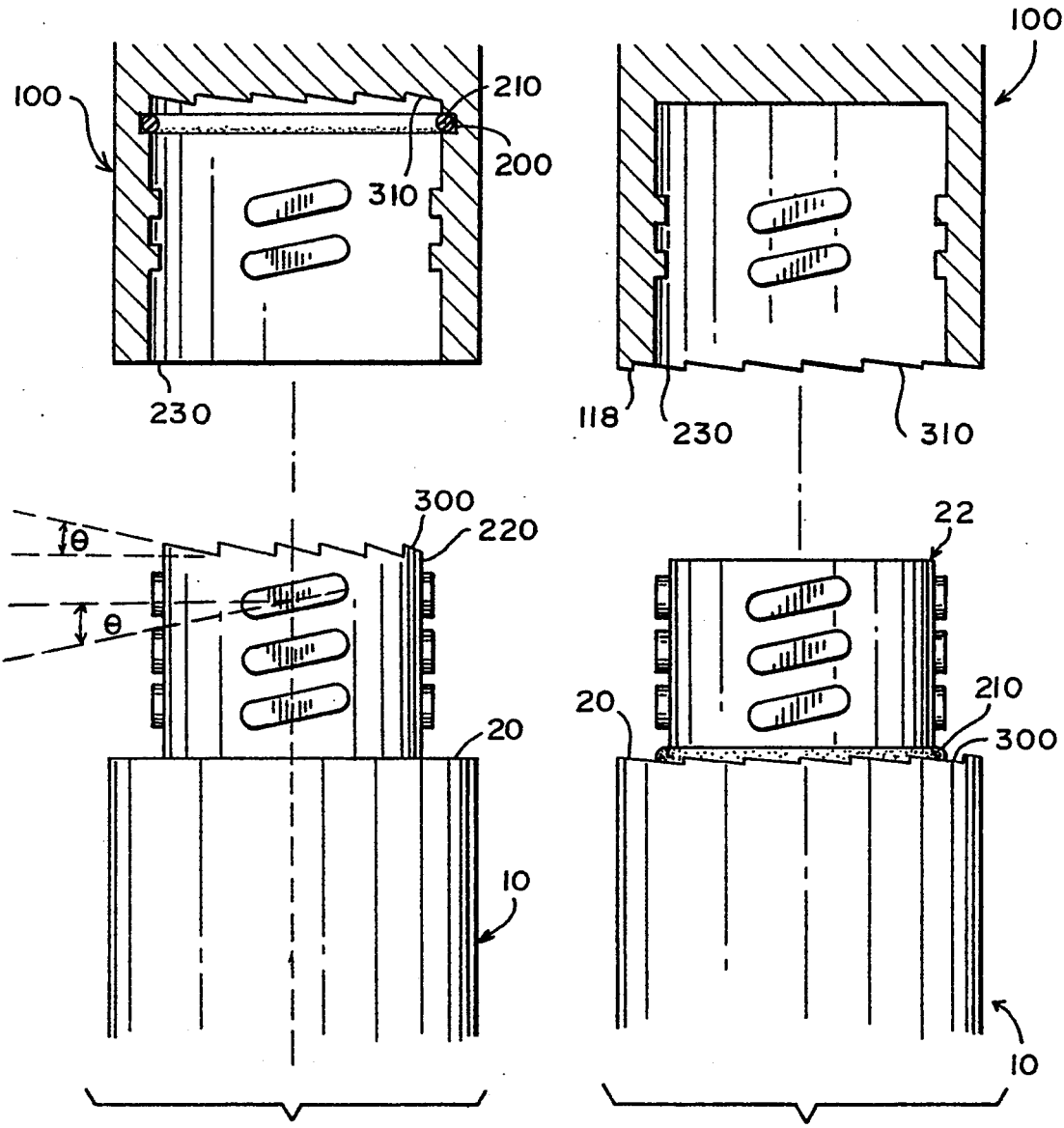
FIG. 8 is an elevational view, partly in section showing an alternative embodiment of the invention with an O-ring and locking means.
FIG. 9 is a view similar to FIG. 8 showing an alternative placement of the O-ring and locking means.

FIGS. 8 and 9 show alternative embodiments of the invention which include an O-rings 210. An O-ring can be used to produce a leak-proof coupling. FIG. 8 shows the O-ring 210 positioned near the base or near the rearmost portion of the interior of the cup-shaped socket member 100. The O-ring 210 is captured in a circumferential slot 200, the circumferential plane of which is perpendicular to the longitudinal axis of the coupling, to prevent movement of the O-ring during assembly or disassembly of the pipe coupling. The upper exterior lip 220 of the pin member 10 engages the O-ring to create a leak-tight seal.

FIG. 9 shows an alternative placement of the O-ring on the pin member 10. In this alternative embodiment, the O-ring is positioned at the intersection of the forward section 22 and the face 20 of the shoulder 18. The interior lip 230 of the socket member 100 engages the O-ring in this alternative.

Key-slots generally of an elongated construction and being parallel to the longitudinal axis of the coupling are shown in FIG. 1 at 30 and 120 on the outside cylindrical surfaces of the pin member 10 and socket member 100 respectively. These longitudinal slots are formed to accept a mating tool such as a spanner wrench to be used to rotate the pin and socket members in relation to each other.

In some instances it is advantageous to lock the pin and socket members by positive locking means rather than just relying on the friction between the fins 26 and 116 and the surfaces 20 and 118. To this end inter-locking saw-toothed members formed on both the pin and socket members as shown in FIGS. 8 and 9 provide a positive locking means which may either permanently or removably lock the members together depending upon the shape and depth of the teeth or forward most rim of the cup-shaped socket member. In a preferred embodiment the angle $\theta$ of the saw-teeth as shown in FIG. 8 is substantially equal to angle $\theta$ of the pitched fins.

FIG. 8 shows the saw-toothed locking member 300 formed on the end or face of the forward most section 22 of the pin member 10. The mating surface 310 of the socket is in this configuration is shown at the base of the interior of the cup-shaped socket member 100. Alternatively, the inter-locking saw-toothed shaped locking members may be formed on face 20 of shoulder 18 at 300 of the pin member and on the face of the socket member as shown at 310 in FIG. 9.

It should be apparent that many modifications may be made to the invention without departing from the spirit and scope of the invention. Therefore, the drawings and description relating to the use of the invention are presented for purposes of illustration and direction only.

What is claimed is:

1. A pipe coupling comprising:
   a pin element having a longitudinal axis and an outer curvilinear axially extending surface integrally connected to a shoulder, the outer surface having at least three axially extending columns of first fins extending radially outwardly on the curvilinear surface, and said pin having a circumferential forward face, said face having formed thereon a first locking means comprising a first endless saw: tooth pattern;
   said at least three axially extending columns of first fins being circumferentially spaced apart with a non-tinned space between said columns, each column having at least one fin having an engaging surface, and pitched at an angle $\theta$ defined by the angle formed as a result of the intersection of a line perpendicular to the longitudinal axis of the coupling and the longitudinal axis of the fins;
   a socket element having a cup-shaped inner curvilinear surface member with a base, said cup-shaped inner curvilinear surface being of a diameter to fit over the outer surface and the fins of the first element; said socket base having formed thereon a circumferentially forward facing rim supporting second locking means formed thereon comprising a second endless saw tooth pattern, said second saw tooth pattern being oppositely angled with respect to said first saw tooth pattern;
   said second fins; being positioned in at least two axially extending columns which are circumferentially spaced apart in a manner similar to said first fins, with a non-tinned space between columns, each column having at least one fin;
   at least some of said second fins having an engaging surface, said fins pitched at an angle $\theta$ with respect to said longitudinal axis;
   said first and second fins being positioned so that the outer surface of the pin element may be axially inserted into the cup-shaped surface of the socket element and then rotated so that the engaging surfaces of the first fins engage the engaging surfaces of the second fins and the first locking means of the pin engage the second locking means of the socket so as to maintain said pin element with said socket element in an engaged relationship that cannot be unengaged without destroying the coupling.

2. The coupling means of claim 1 wherein the forward facing surface of the pin element is the rim of the shoulder and the forward facing surface of the socket is a rim of the cup-shaped member.

3. The coupling of claim 1 wherein the forward facing surface of the pin is the rim of the outer axially extending surface, and the forward facing surface of the socket is the base of the cupped-shaped member.

4. The coupling of claim 3 further comprising an O-ring positioned at the intersection of the pin and the face of the shoulder of the pin.

5. The coupling of claim 1 wherein an angle $\theta$ of the saw teeth is substantially equal to the pitched angle of the fins.

6. The coupling of claim 1 further comprising a plurality of elongated slots on the outside surfaces of the coupling, said slots receiving tool means.

7. The coupling of claim 1 wherein said cup-shaped inner cylindrical surface has a circumferential groove for receiving an O-ring.

8. The coupling of claim 1 wherein said pin element has a forward and a rearward section integrally connected by a shoulder, and said socket element has a forward and a rearward section integrally connected by a shoulder, and a section of each pin and socket element having elongated slots on their outside surfaces, for receiving tool means.

9. The coupling of claim 8 wherein the rear section of the pin member and the rear section of the coupling is unitary with a tube.

10. The coupling of claim 8 wherein the rear section of the pin defines a frustoconical opening.

11. The coupling of claim 10 wherein the rear section of the socket defines a frustoconical opening.

12. The pipe coupling of claim 1, wherein said fins are substantially rectangular with continuously rounded ends.

* * * * *